United States Patent
Chuang et al.

(10) Patent No.: US 9,290,039 B2
(45) Date of Patent: *Mar. 22, 2016

(54) PRODUCTION METHOD OF WORKPIECE AND WORKPIECE WITH THREE-DIMENSIONAL PATTERN

(75) Inventors: Wan-Li Chuang, Taipei (TW);
Chien-Min Chang, Taipei (TW);
Tsung-Sheng Chuang, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 1148 days.

This patent is subject to a terminal disclaimer.

(21) Appl. No.: 13/304,400

(22) Filed: Nov. 24, 2011

(65) Prior Publication Data

US 2012/0070631 A1 Mar. 22, 2012

Related U.S. Application Data

(63) Continuation-in-part of application No. 12/881,185, filed on Sep. 14, 2010, now abandoned.

(60) Provisional application No. 61/241,962, filed on Sep. 14, 2009.

(51) Int. Cl.
*B32B 3/10* (2006.01)
*B44C 1/20* (2006.01)
*B32B 38/06* (2006.01)
(Continued)

(52) U.S. Cl.
CPC . *B44C 1/20* (2013.01); *B32B 38/06* (2013.01); *B44C 5/0415* (2013.01); *B32B 38/0036* (2013.01); *B32B 38/162* (2013.01); *B32B 2310/0806* (2013.01); *B32B 2451/00* (2013.01); *B32B 2457/00* (2013.01); *Y10T 428/24802* (2015.01)

(58) Field of Classification Search
CPC .............................. B32B 38/06; B32B 38/0036
USPC ........................... 427/207.1, 208.6; 428/195.1
See application file for complete search history.

(56) References Cited

U.S. PATENT DOCUMENTS

2002/0157786 A1* 10/2002 Tarnawskyj et al. ........ 156/304.5

FOREIGN PATENT DOCUMENTS

| TW | M248633 | 11/2004 |
|----|---------|---------|
| TW | I268843 | 12/2006 |

(Continued)

OTHER PUBLICATIONS

"Office Action of Taiwan counterpart application" issued on Nov. 13, 2012, p. 1-p. 9, in which the listed references were cited.

(Continued)

*Primary Examiner* — Xiao Zhao
(74) *Attorney, Agent, or Firm* — Jianq Chyun IP Office

(57) ABSTRACT

A production method of workpiece is provided. First, an adhesive layer is applied on a workpiece. The adhesive layer is impressed by a mold, so that the adhesive layer forms a three-dimensional pattern. A first curing process with a first irradiating energy is performed on the adhesive layer. The workpiece is punched after the first curing process is performed on the adhesive layer, so that the workpiece forms a three-dimensional workpiece. A second curing process with a second irradiating energy is performed on the adhesive layer after the workpiece is punched, wherein the second irradiating energy intensity is higher than the first irradiating energy intensity.

11 Claims, 4 Drawing Sheets

(51) Int. Cl.
 *B44C 5/04* (2006.01)
 *B32B 38/00* (2006.01)
 *B32B 38/16* (2006.01)

(56) References Cited

FOREIGN PATENT DOCUMENTS

| TW | 200709785 | 3/2007 |
| TW | 200742945 | 11/2007 |
| TW | 200911560 | 3/2009 |
| TW | 200934795 | 8/2009 |

OTHER PUBLICATIONS

"Office Action of Taiwan Counterpart Application", issued on Dec. 7, 2011, p. 1-p. 5, in which the listed references were cited.
"Office Action of Taiwan Counterpart Application", issued on May 21, 2012, p. 1-p. 3, in which the listed references was cited.
"Office Action of Taiwan Counterpart Application", issued on Jun. 19, 2012, p. 1-p. 7, in which the listed reference was cited.

* cited by examiner

… (1)

PRODUCTION METHOD OF WORKPIECE AND WORKPIECE WITH THREE-DIMENSIONAL PATTERN

CROSS-REFERENCE TO RELATED APPLICATION

This application is a continuation-in-part of and claims the priority benefit of U.S. application Ser. No. 12/881,185, filed on Sep. 14, 2010, which claims the priority benefit of U.S. provisional application Ser. No. 61/241,962, filed on Sep. 14, 2009. The entirety of each of the above-mentioned patent applications is hereby incorporated by reference herein and made a part of this specification.

BACKGROUND OF THE INVENTION

1. Field of the Invention

The invention generally relates to a workpiece and a production method thereof, and more particularly to a workpiece with three-dimensional pattern and a production method thereof.

2. Description of Related Art

Currently, electronic devices such as notebook computers, mobile phones, or digital cameras mostly adopt metal material for constituting the exterior. In order to advance the overall aesthetic appearance of electronic devices, various patterns are usually formed on the appealing configuration. Patterns are produced on the surface of metal material frequently by etching metal material with a solvent or by paint-spraying and transfer printing. Nonetheless, the surface treatment technique of the former is complicated and difficult, and the production thereof is highly contaminative. The latter is restrained by the chemical property of metal material, such that artistic configuration cannot be produced.

SUMMARY OF THE INVENTION

The invention is directed to a production method of a workpiece, so that a three-dimensional pattern is formed on the workpiece, an adhesive layer having the three-dimensional pattern is prevented from cracking while the workpiece is punched, and the workpiece has better malleability while being punched.

An embodiment of the invention provides a production method of a workpiece. An adhesive layer is applied on a workpiece. The adhesive layer is impressed by a mold so as to form a three-dimensional pattern. A first curing process with a first irradiating energy is performed on the adhesive layer. The workpiece is punched after the first curing process is performed on the adhesive layer, so that the workpiece forms a three-dimensional workpiece. A second curing process with a second irradiating energy is performed on the adhesive layer after the workpiece is punched, wherein the second irradiating energy intensity is higher than the first irradiating energy intensity.

An embodiment of the invention provides a workpiece with three-dimensional pattern. The workpiece includes a three-dimensional workpiece and an adhesive layer. The three-dimensional workpiece has a plate portion and a side wall portion. The adhesive layer is attached to the three-dimensional workpiece and impressed by a mold to form a three-dimensional pattern. The adhesive layer is tightly fitting on the plate portion, the side wall portion, and a junction between the plate portion and the side wall portion. The adhesive layer is heated by a first curing process before a punching process. The adhesive layer is heated by a second curing process to fix the position and the shape of the three-dimensional pattern after the punching process.

In light of the foregoing, in the embodiments of the invention, the three-dimensional pattern is formed by applying the adhesive layer on the workpiece and impressing the mold on the adhesive layer. As a consequence, the technical requirements for forming three-dimensional pattern on workpiece are lowered effectively. Moreover, the readily production also increases the production efficiency of the workpiece.

In addition, the adhesive layer is cured by the first curing process with lower irradiating energy intensity before the workpiece is punched, such that the adhesive layer is not entirely cured and has elasticity to prevent the adhesive layer from cracking while the workpiece is punched, and the workpiece has better malleability while being punched so that the thickness of the punched workpiece is more uniform. After the workpiece is punched, the adhesive layer is cured by the second photo-curing process with higher irradiating energy intensity, such that the adhesive layer is entirely cured.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
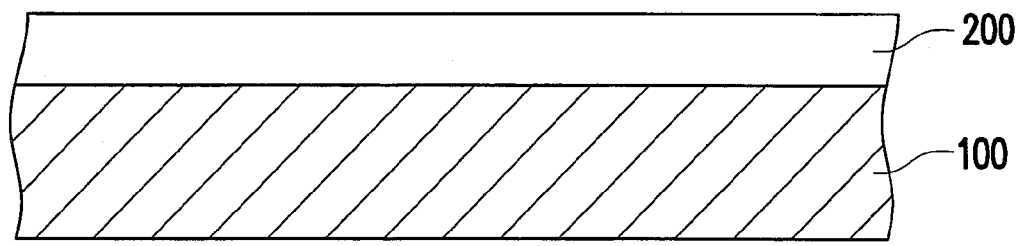
FIGS. 1-6 are flow diagrams of a production method of a workpiece according to an embodiment of the invention.
Figure 2:
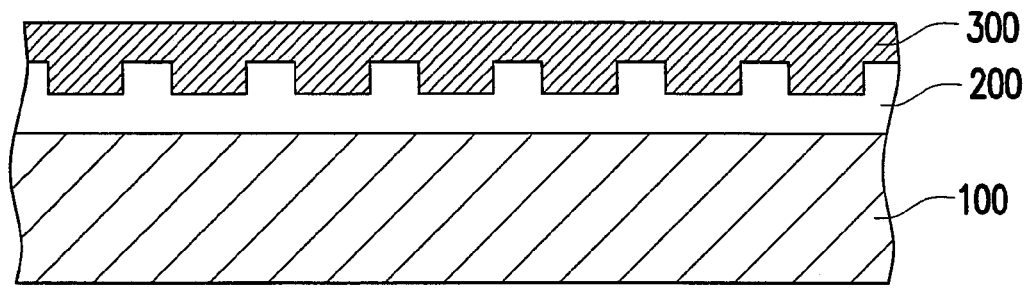
Figure 3:
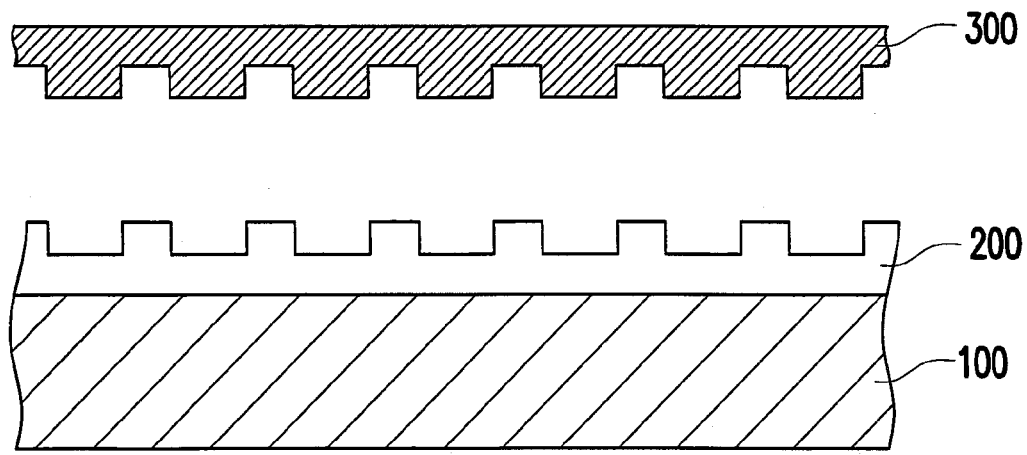
Figure 4:
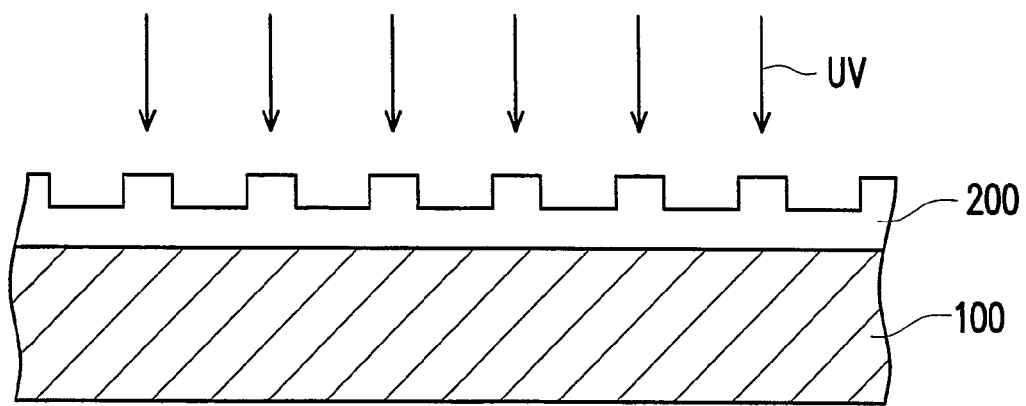
Figure 5:
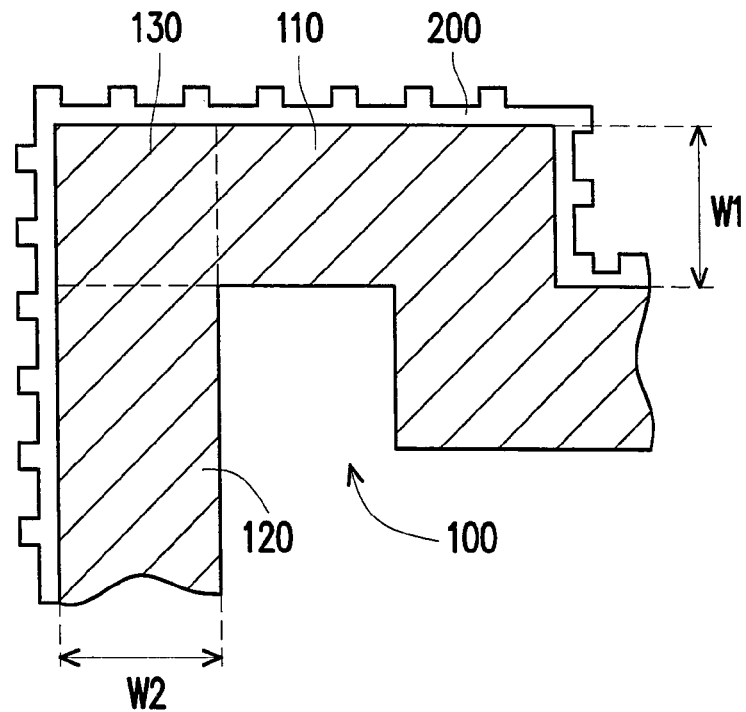
Figure 6:
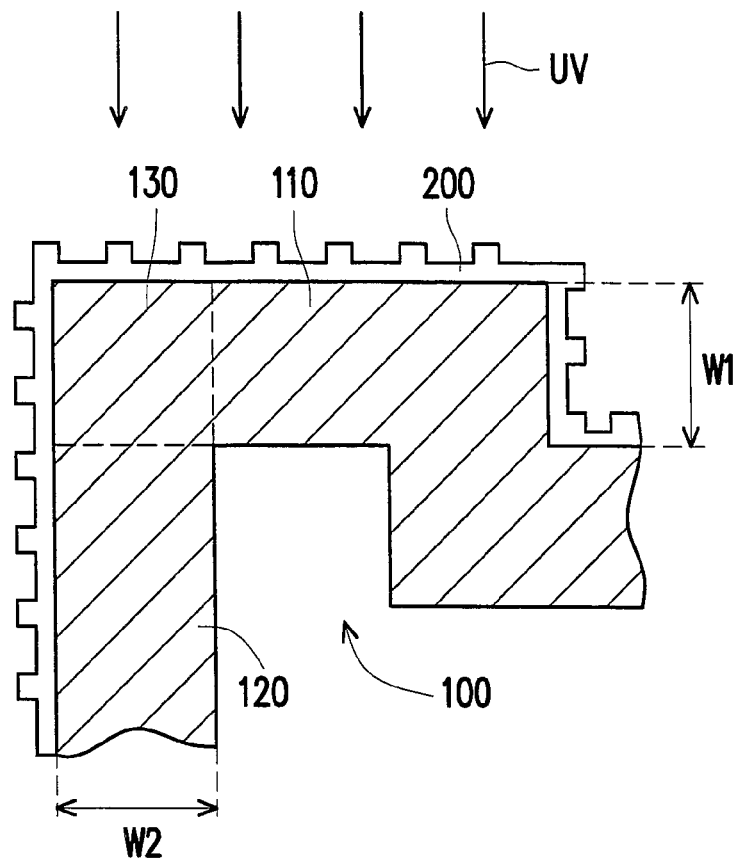

FIGS. 1-6 are flow diagrams of a production method of a workpiece according to an embodiment of the invention. Referring to FIGS. 1-6, in the present embodiment, an adhesive layer 200 is applied on a workpiece 100 as shown in FIG. 1. The adhesive layer 200 is impressed by a mold 300 as shown in FIG. 2. The mold 300 is removed and a three-dimensional pattern is formed on the workpiece 100 as shown in FIG. 3, and a first curing process with a first irradiating energy intensity is performed on the adhesive layer 200 as shown in FIG. 4. The workpiece 100 is punched as shown in FIG. 5 after the first curing process is performed on the adhesive layer 200, so that the workpiece 100 forms a three-dimensional workpiece. A second curing process with a second irradiating energy intensity is performed on the adhesive layer 200 as shown in FIG. 6 after the workpiece 100 is punched to fix the position and the shape of the three-dimensional pattern, wherein the second irradiating energy intensity is higher than the first irradiating energy intensity. The workpiece 30 is just an example of workpiece materials. The workpiece 30 can be a sole metal workpiece or a carbon-fiber and metal workpiece.

The first curing process and the second curing process may be photo-curing processes and applied by UV irradiating. The irradiating energy intensity of the UV irradiating of the first photo-curing process is for example 200 to 300 mj/cm$^2$, and the irradiating energy intensity of the UV irradiating of the second photo-curing process is for example 1000 to 1200 mj/cm$^2$. The mold 300 could be made of transparent material so as to be pervious to light, such that the first photo-curing process could be performed before the mold 300 is removed. The first and second curing processes can be thermal-curing process, and the irradiating energy of the first thermal-curing process is higher than the irradiating energy of the second thermal-curing process.

In the embodiment, the adhesive layer 200 is cured by the first curing process with lower irradiating energy intensity before the workpiece 100 is punched, such that the adhesive layer 200 is not entirely cured and has elasticity to prevent the adhesive layer 200 from cracking while the workpiece 100 is punched, and the workpiece 100 has better malleability while being punched so that the thickness of the punched workpiece 100 is more uniform. After the workpiece 100 is punched, the adhesive layer 200 is cured by the second curing process with higher irradiating energy intensity, such that the adhesive layer 200 is entirely cured.

Specifically, the three-dimensional workpiece 100 shown in FIG. 6 has a plate portion 110, a side wall portion 120 and a junction 130 between the plate portion 110 and the side wall portion 120. The adhesive layer 200 is tightly fitting on the plate portion 110, the side wall portion 120 and the junction 130. The workpiece 100 has better malleability before the second curing process with higher irradiating energy intensity is performed, such that the plate portion 110 and the side wall portion 120 are prevented from having different thicknesses after the workpiece 100 is punched. As FIGS. 5 and 6 showing, the thickness W1 of the plate portion 110 is equal to the thickness W2 of the side wall portion 120.

In the present embodiment, the workpiece 100 is made of, for example, aluminum alloy (5052), stainless steel (430, 304), cold rolling steel (spec), magnesium alloy (AZ91D, AZ61) or other metal materials suitable for constituting the exterior. Before the adhesive layer 200 is applied on the workpiece 100, pre-treatment processes such as degreasing and baking are first performed to the workpiece 100 to ensure impurities that prevent the adhesive layer 200 from adhering to the workpiece 100 are eliminated.

After being applied on the workpiece 100, the adhesive layer 200 is suitably baked and heated to reduce the fluidity thereof. The mold 300 having a three-dimensional pattern is provided. A three-dimensional pattern complementary to the pattern of the mold 300 can be formed on the adhesive layer 200 by impressing the mold 300 on the semi-dry adhesive layer 200.

In the present embodiment, the workpiece 100 is, for instance, a metal plate. Thus, in the process of producing this workpiece 100, the production efficiency of the workpiece 100 can enhanced by transporting and processing with a roller apparatus. The appealing configuration of the workpiece 100 produced from the roller apparatus is further processed as shown in FIG. 5 using a punching apparatus so as to punch the workpiece 100 from a plate state into a three-dimensional workpiece. Accordingly, the workpiece 100 of the present embodiment first forms the three-dimensional pattern in the plate state by using the above technique, and the workpiece 100 is then processed by the punching apparatus depending on the configuration required. Consequently, the technical difficulty of forming the three-dimensional pattern on the surface of the three-dimensional workpiece is overcome, and the suitability of the workpiece 100 is further increased.

Figure 7:
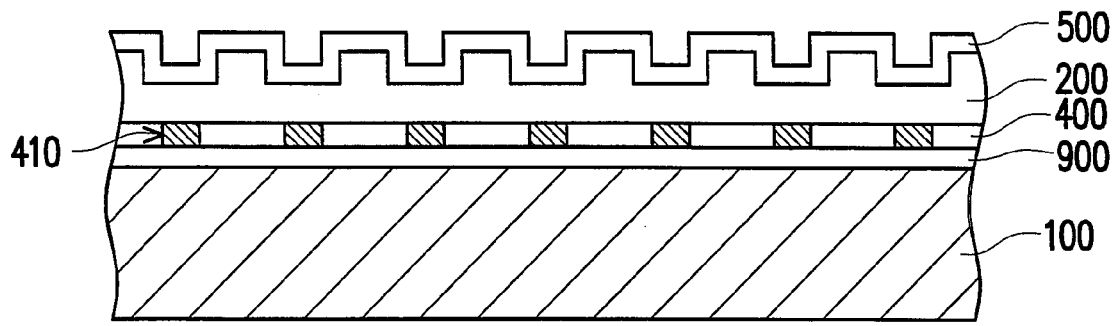
FIG. 7 is a schematic view of a workpiece according to another embodiment of the invention.

FIG. 7 is a schematic view of a workpiece according to another embodiment of the invention. Unlike the above embodiment, before the adhesive layer 200 is applied on the workpiece 100, a primer layer 900 is first applied on the workpiece 100 for adhering the adhesive layer 200 and the workpiece 100. In addition, in the present embodiment, a color layer 400 is further disposed on the primer layer 900, so as to color the workpiece 100. The method of coloring the workpiece 100 is not limited in the present embodiment, and the color layer 400 can be disposed on the primer layer 900 by applying, screen printing, offset printing or intaglio printing. The color layer 400 may have two-dimensional patterns 410, which and the three-dimensional patterns are continuous at bending portions of the workpiece 100. The thickness of portions of the adhesive layer 200 at bending portions of the workpiece 100 is less than the thickness of portions of the adhesive layer 200 at flat portions of the workpiece 100. Therefore, the three-dimensional patterns of the adhesive layer 200 and the two-dimensional patterns 410 can generate three-dimensional visual effects of pattern or grating by interference. After the adhesive layer 200 is cured, a passivation layer 500 is disposed thereon to prevent the following punching process from damaging the surface of the workpiece 100.

Figure 8:
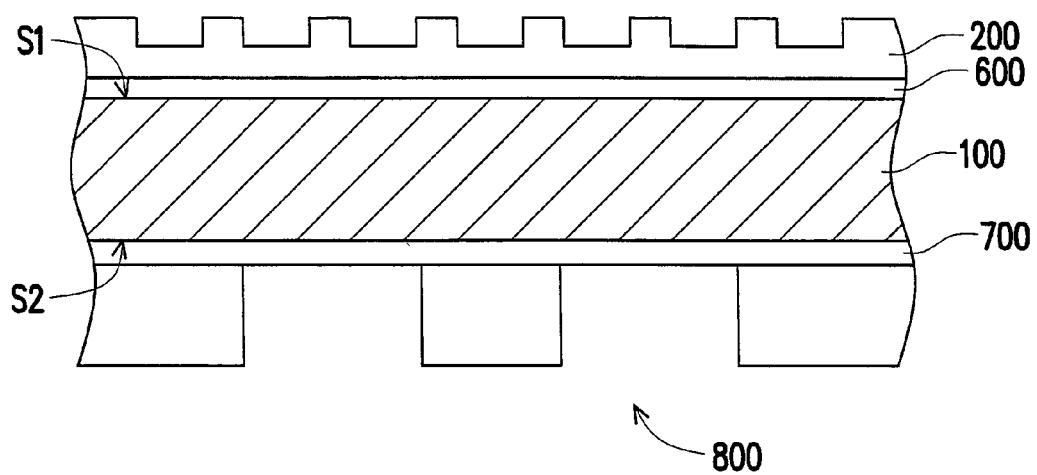
FIG. 8 is a schematic view of a workpiece according to another embodiment of the invention.

FIG. 8 is a schematic view of a workpiece according to another embodiment of the invention. Referring to FIG. 8, in the present embodiment, the workpiece 100 has a first surface S1 and a second surface S2 disposed in a back to back manner. Before the adhesive layer 200 is applied, a first primer layer 600 and a second primer layer 700 are applied on the first surface S1 and the second surface S2 respectively. Consequently, the first surface S1 and the second surface S2 of the workpiece 100 are adhesive. Thereafter, the adhesive layer 200 is applied on the first primer layer 600. A plurality of three-dimensional components 800 could be formed on the second primer layer 700 on the second surface S2 of the workpiece 100 as shown in FIG. 8 by using the injection molding technique. These three-dimensional components 800 are, for example, a plurality of bosses for assembling other components on the workpiece 100 conveniently.

On the other hand, referring to FIGS. 7 and 8 simultaneously, in the embodiment shown in FIG. 8, the first primer layer 600 is a color primer layer, where a color dye is added to the primer layer 600, for example. Thus, the workpiece 100 is colored without having additional color layer 400 printed on the primer layer 900 in FIG. 7.

In summary, in the aforementioned embodiments of the invention, the three-dimensional pattern is formed on the workpiece by applying the adhesive layer on the workpiece and impressing the adhesive layer with the mold. Accordingly, the technical difficulty of forming the three-dimensional pattern on the workpiece is effectively reduced.

In addition, the adhesive layer is cured by the first photo-curing process with lower irradiating energy intensity before the workpiece is punched, such that the adhesive layer is not entirely cured and has elasticity to prevent the adhesive layer from cracking while the workpiece is punched, and the workpiece has better malleability while being punched so that the thickness of the punched workpiece is more uniform. After the workpiece is punched, the adhesive layer is cured by the second photo-curing process with higher irradiating energy intensity, such that the adhesive layer is entirely cured.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A production method of a workpiece, the production method comprising:
    applying an adhesive layer on a workpiece;
    impressing the adhesive layer by using a mold, so that the adhesive layer forms a three-dimensional pattern;
    performing a first curing process with a first irradiating energy on the adhesive layer;
    punching the workpiece after performing the first curing process on the adhesive layer, so that the workpiece forms a three-dimensional workpiece; and performing a second curing process with a second irradiating energy on the adhesive layer after punching the workpiece, wherein the second irradiating energy is higher than the first irradiating energy.

2. The production method of the workpiece as claimed in claim 1, further comprising:
applying a primer layer on the workpiece before applying the adhesive layer.

3. The production method of the workpiece as claimed in claim 2, further comprising:
disposing a color layer on the primer layer, wherein the color layer has a two-dimensional pattern.

4. The production method of the workpiece as claimed in claim 2, wherein the primer layer is a color primer layer.

5. The production method of the workpiece as claimed in claim 2, wherein the workpiece has a first surface and a second surface disposed in a back to back manner, the primer layer comprises a first primer layer and a second primer layer, the first primer layer and the second primer layer are applied on the first surface and the second surface respectively, and the adhesive layer is applied on the first primer layer on the first surface.

6. The production method of the workpiece as claimed in claim 5, further comprising:
injection molding a three-dimensional component on the second primer layer on the second surface.

7. The production method of the workpiece as claimed in claim 1, further comprising:
disposing a passivation layer on the adhesive layer.

8. The production method of the workpiece as claimed in claim 1, wherein the workpiece is a metal plate, a fiber and metal plate or a carbon-fiber and metal plate.

9. The production method of the workpiece as claimed in claim 1, wherein a pre-treatment process of degreasing is performed to the workpiece.

10. The production method of the workpiece as claimed in claim 1, wherein the mold is a transparent mold.

11. The production method of the workpiece as claimed in claim 1, wherein the curing process can be a radiation-curing process or a thermal-curing process.

\* \* \* \* \*